United States Patent [19]

Burgarella

[11] 3,757,643
[45] Sept. 11, 1973

[54] PHOTOFLASH APPARATUS
[75] Inventor: John P. Burgarella, Sudbury, Mass.
[73] Assignee: Polaroid Corporation, Cambridge, Mass.
[22] Filed: Jan. 31, 1972
[21] Appl. No.: 222,258

[52] U.S. Cl. .................. 95/11 R, 95/11 L, 240/1.3
[51] Int. Cl. ............................................. G03b 15/03
[58] Field of Search ............. 95/11 R, 11 L, 11.5 R, 95/10 C; 240/1.3

[56] References Cited
UNITED STATES PATENTS
| | | | |
|---|---|---|---|
| 3,633,476 | 1/1972 | Yazaki et al. | 95/11 R |
| 3,598,985 | 8/1971 | Harnden et al. | 95/11 L |
| 3,113,495 | 12/1963 | Brandt et al. | 240/1.3 X |
| 3,406,619 | 10/1968 | Rentschler | 95/11 R X |
| 3,430,545 | 3/1969 | Wick | 95/11 R |

Primary Examiner—Robert P. Greiner
Attorney—Alfred E. Corrigan et al.

[57] ABSTRACT

A flash socket assembly for use with a camera having an exposure control circuit convertible between ambient and flash modes of operation, and a flash assembly especially adapted for use therewith. The flash assembly includes a connector having a set of terminals for a photoflash lamp and an electrically conductive strip. The strip is adapted to bridge a pair of spaced contacts in the socket assembly to convert the exposure control circuit of the camera from an ambient mode of operation to a flash mode of operation upon coupling the flash assembly to the socket assembly.

42 Claims, 6 Drawing Figures

PHOTOFLASH APPARATUS

BACKGROUND OF THE INVENTION

1. Field of the Invention

This invention relates to photographic flash apparatus for converting an exposure control system from an ambient mode of operation to a flush mode of operation.

2. Description of the Prior Art

Many types of camera shutters are presently known wherein the duration of an exposure which is effected by movement of one or more shutter elements is controlled automatically in accordance with the light received from the scene being photographed. This automatic control is accomplished by an exposure control circuit having photoresponsive means. However, it has been found that when photoresponsive means are employed to provide automatic control of exposure duration both when the scene light is substantially constant in intensity (ambient light) and when it is changing during exposure, as when provided by photoflash apparatus, it is necessary to compensate for errors which would otherwise result from the automatic operation of the control circuit. For example, as described in U. S. Pat. No. 3,200,723, there is a mechanical delay in closing the shutter after the proper exposure has been made. This mechanical delay may, when the intensity of the scene light is substantially constant, be compensated for by the delay associated with the opening blade of the shutter moving to its exposure initiating position. However, when the intensity of the light is not constant, such as when a photoflash lamp is used to illuminate the subject, a compensating factor must be introduced into the exposure control circuit of the shutter to prevent overexposure of the film unit. Therefore, exposure control circuits are now provided with a flash compensating circuit which can be selectively connected into the exposure control circuit to compensate for the aforementioned error. Connecting the flash compensating circuit into the exposure control circuit converts the exposure control circuit from an ambient mode of operation to a flash mode of operation.

Generally, exposure control circuits of the type described are converted from the ambient to the flash mode of operation by the user manually actuating a switch, or the conversion takes place automatically upon coupling the flash apparatus to the camera. Obviously, the former method of converting the exposure control circuit to a flash mode of operation leaves much to be desired. Manual actuation of the switch requires the attention of the user since he must remember to connect the compensating circuit into the exposure control circuit by closing the switch before taking a flash exposure, and he must not forget to open the switch prior to making exposures under ambient light conditions. The latter method of conversion is also objectionable in that a switch having a pivoted contact arm movable through an arc is usually used to close the switch and thereby incorporate the compensating circuit into the exposure control circuit. Specifically, this type of switching arrangement is objectionable because the movable contact arm (1) requires space in which to move between the open and closed positions of the switch thereby utilizing space which is at a premium in a compact camera, (2) usually does not engage the stationary contact with a sliding or wiping action thereby losing the benefit to be derived therefrom, i.e., cleaning of the contact areas, and (3) does not insure a positive return of the exposure control circuit to the ambient mode of operation upon uncoupling the flash apparatus from the camera since it is possible, through damage to the movable contact arm, for the movable contact arm to be locked in the closed position.

SUMMARY OF THE INVENTION

The present invention obviates the objections stated above by providing a camera of the type having an exposure control circuit convertible between ambient and flash modes of operation with a flash socket assembly having at least one contact which is adapted to be slidably engaged by an electrically conductive member located on the connector of a flash assembly for converting the exposure control circuit from an ambient mode of operation to a flash mode of operation upon coupling the flash assembly to the camera. In a preferred embodiment the socket assembly includes a first set of resilient contacts which are adapted to be slidably engaged by a similar number of terminals mounted on the connector of the flash assembly for electrically coupling at least one of the photoflash lamps in the flash assembly to a flash firing circuit in the camera. The socket assembly further includes a second set of contacts consisting of a pair of spaced contacts which are adapted to be bridged by a strip of electrically conductive material mounted on the connector to convert the exposure control circuit from an ambient to a flash mode of operation upon coupling the connector to the socket assembly. In other words, the spaced pair of contacts define an open switch in the exposure control circuit which is closed by the bridging action of the electrically conductive member to introduce a flash compensating function into the circuit. The flash assembly may include either one or more photoflash lamps having a common orientation, in which case periodic replacement of part of the switch defined by the spaced contacts and the strip is automatically replaced each time the flash assembly is changed. Alternatively, the flash assembly may include a plurality of photoflash lamps of dissimilar orientation having separate terminals and conducting strips for each lamp or group of lamps having a similar orientation whereby part of the switch would automatically be replaced each time a lamp, or group of lamps having a common orientation, and the associated terminals and strip was moved into a predetermined position relative to the taking axis of the camera's lens. The socket assembly further includes a plurality of spacing elements interdigitated with the pair of spaced contacts to maintain their alignment relative to each other and to prevent accidental closing of the switch by movement of one of the contacts into engagement with the other contact. Also, the pair of spaced contacts may be made from any suitable resilient material and formed in such a manner as to apply a predetermined loading on the connector to assist the first set of contacts in maintaining the coupling between the connector and the socket assembly.

In an alternative embodiment, the connector of the flash assembly has mounted thereon a plurality of terminals including a common ground terminal and an electrically conductive strip connected to the common ground terminal. The socket assembly includes a plurality of contacts, two of which represent an open switch in the exposure control circuit. When the connector of the flash assembly is coupled to the socket assembly, the lamps in the flash assembly are electrically coupled with the camera's flash firing circuit and the electrical engagement between the two contacts and the strip and common ground terminal closes the previously open switch of the exposure control circuit thereby converting the exposure control circuit to a flash mode of operation.

In still another embodiment of the invention a supporting ring on a conventional rotatable flash cube is provided with a strip of electrically conductive material which, when engaged by a spaced pair of contacts, converts the exposure control circuit from an ambient to a flash mode of operation.

In still another embodiment the flash assembly is provided with two spaced connector blades, each blade carrying thereon a set of terminals and an electrically conductive member for oppositely facing arrays of lamps. The spaced blades are adapted to straddle a camera housing to couple the flash assembly to an exposure control circuit and flash sequencing circuit in the camera.

In the above described embodiments, the interface between the contacts and terminals is preferably such that a simultaneous engagement takes place between the two, thereby insuring operation of the exposure control circuit in the flash mode only when at least one of the photoflash lamps of the flash assembly is electrically coupled to the camera's flash firing circuit.

An object of the invention is to provide a camera of the type having an exposure control circuit convertible between ambient and flash modes of operation with means for automatically converting the exposure control ciruit to a flash mode of operation upon coupling a flash assembly thereto.

Another object of the invention is to provide a camera of the above type with a socket assembly having means engageable by an electrically conductive member on a flash assembly for converting the exposure control circuit to a flash mode of operation.

Still another object of the invention is to provide a flash assembly with electrically conductive means for completing a segment of an exposure control circuit to convert the latter to a flash mode of operation.

Still another object of the invention is to provide for a sliding interface between electrically conductive means on a flash assembly and contact means in a flash socket assembly for converting an exposure control circuit from an ambient mode of operation to a flash mode of operation.

Still another object of the invention is to provide a flash assembly with electrically conductive means which function as periodically replaceable parts of a switch for converting an exposure control circuit between ambient and flash modes of operation.

Other objects of the invention will in part be obvious and will, in part, appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
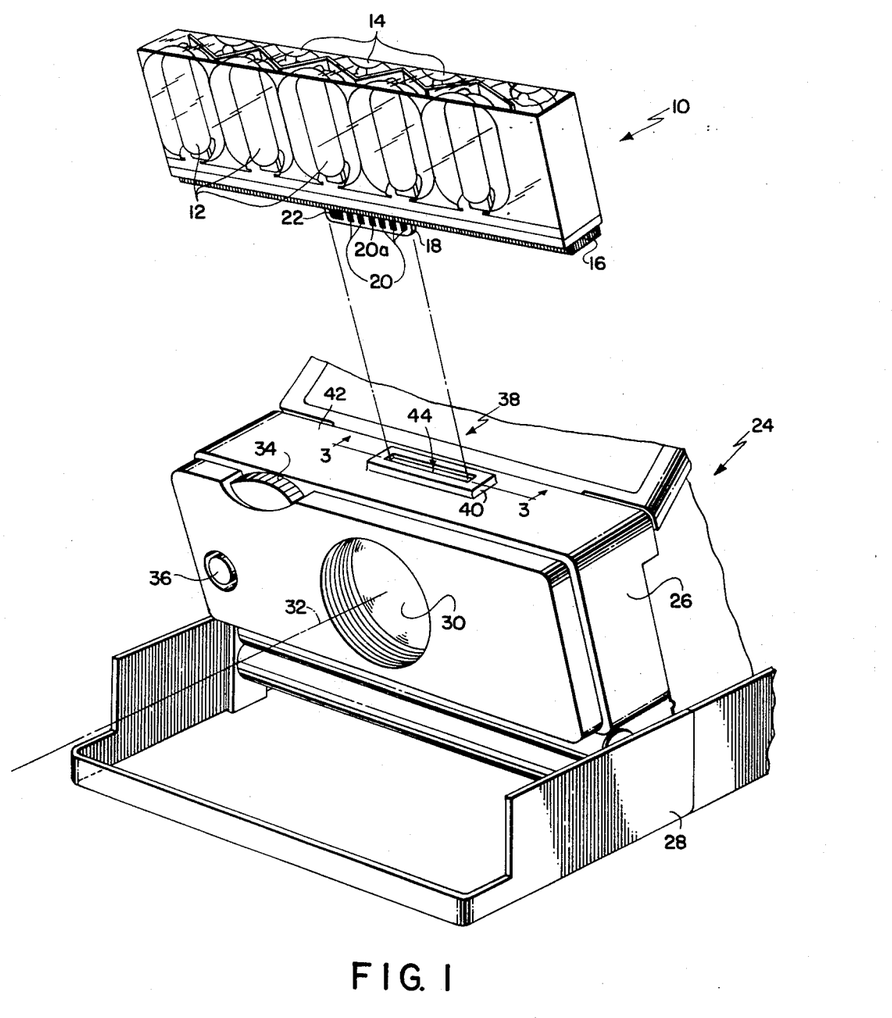
FIG. 1 is a perspective view of the front portion of a photographic camera embodying a flash illumination system including a flash socket assembly and a multilamp flash assembly adapted for connection to the socket assembly, the flash assembly being shown exploded from the socket assembly for clarity of illustration.

Reference is now made to FIG. 1 wherein is shown a disposable multilamp flash assembly 10 of a type and construction similar to that shown and described in U.S. Pat. Nos. 3,598,985 and 3,598,984. Flash assembly 10 is shown as comprising a first linear array of lamps 12 and a second oppositely facing linear array of lamps 14. A support structure 16 supports the arrays of lamps 12, 14 and a relatively thin, shallow connector blade 18 extends downwardly therefrom and carries on opposite faces first and second sets of terminals for the lamps.

FIG. 1 shows the terminals as taking the form of a set of terminal strips 20, including a common ground terminal 20a disposed in parallel along the direction in which the flash assembly is inserted into the flash socket assembly. A similar set of terminals (not shown) on the opposite face of the connector blade 18 are electrically connected to the array of lamps 14 facing in the corresponding direction (rearward or to the right as viewed in FIG. 1). Also mounted on each opposite face and at opposite ends of connector blade 18 is an electrically conductive member 22 (only one of which is shown) which is adapted to bridge a pair of contacts in the flash socket assembly for converting an exposure control circuit in the camera from an ambient mode of operation to a flash mode of operation as will be more fully described later. The connector blade 18 is preferably formed from steel having a porcelain electrically insulating glaze thereon. The terminals 20, 20a and the electrically conductive member 22 are then formed on the glaze by silk screening a conductive paint, e.g., silver paint, thereon and then firing the composite blade structure.

Also shown in FIG. 1 is a front portion of a folding camera 24 of the type more fully shown and described in the copending application of Edwin H. Land, Ser. No. 171,127 filed Aug. 12, 1971 and assigned to the same assignee as the instant application. Camera 24 is illustrated as including a shutter housing section 26 mounted to pivot into a face-down position on a housing section 28 when the camera is folded for storage. Housing section 26 includes a lens and shutter assembly 30, which may be of the type shown in U.S. Pat. No. 3,200,723, having a picture taking axis 32, a focus wheel 34 for focusing the lens and a button 36 for initiating the exposure cycle of the camera. Housing section 26 further includes a flash socket assembly 38 having a boss 40 which extends through a wall 42 of section 38 and defines an entrance slot 44 which is orthogonal to picture-taking axis 32 for receiving the connector blade 18 of the flash assembly 10.

Figure 3:
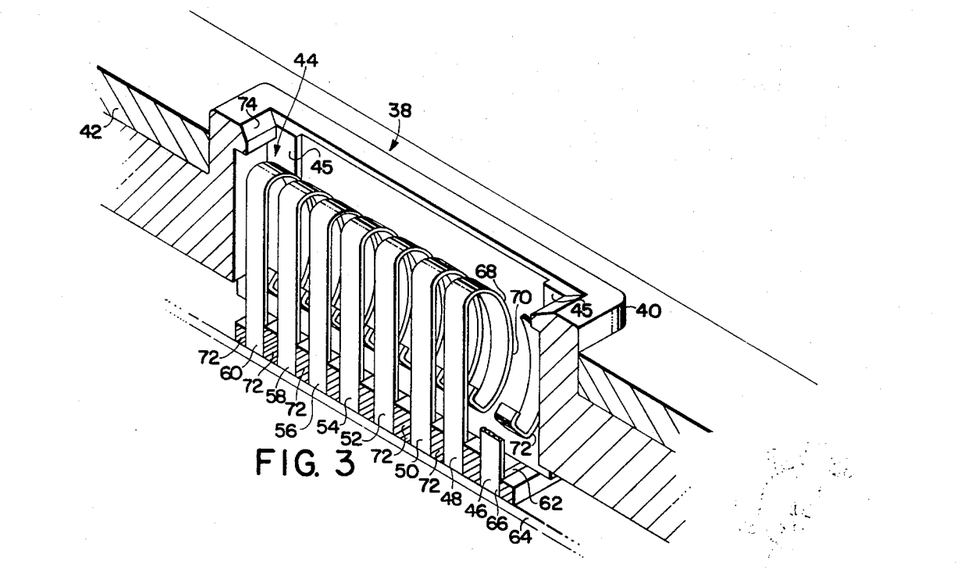
FIG. 3 is a perspective view of a portion of the flash socket assembly taken along the line 3—3 of FIG. 1.

Reference is now made to FIG. 3 wherein socket assembly 38 is shown to include a first set of contacts 46, 48, 50, 52, 54 and 56 which are adapted to be slidably engaged by the set of terminal strips 20 (ground terminal 20a being slidably engaged by contact 52) and a second set of contacts 58 and 60 which are adapted to be slidably engaged and bridged by the electrically conductive member 22. Each of the contacts is preferably composed of a spring material having high electrical conductivity and high tensile strength such as certain beryllium-copper alloys. A nickel-silver coating is preferably applied to the contacts to minimize contact resistance. Each of the contacts includes a base section 62 for connection to leads on a printed circuit substrate 64, a spine 66, and a reverse bent section including an entrance ramp portion 68, a contact portion 70, and an exit ramp portion 72. The entrance and exit ramp portions 68 and 72 assure a smooth insertion and withdrawal of the connector blade. The contact portion 70 applies a loading force on the contiguous surface of the connector blade 18 in a direction normal to the plane of the connector blade so as to retain the blade in the socket assembly and so as not to introduce any lifting force component which might tend to raise the connector blade from the socket assembly. Spacing means 72 are interdigitated with the contacts to maintain the parallel relationship between the contacts and to prevent a contact from moving into electrical engagement with an adjacent contact. Socket assembly 38 also includes an outwardly beveled mouth 74 surrounding exit slot 44 and walls 45 which guide the connector blade 18 into its operative position within the socket assembly.

Figure 2:
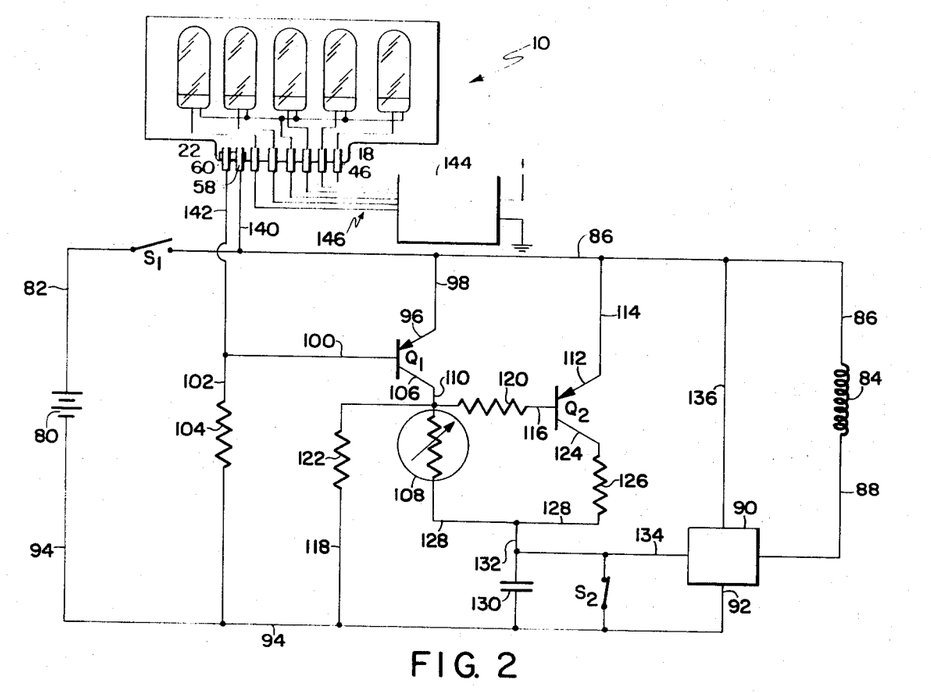
FIG. 2 is a schematic illustration of a flash sequencng circuit and an exposure control circiut connected to the contacts of the flash socket assembly, the contacts in turn being shown in engagement with the terminals and an electrically conductive strip mounted on the connector blade of the flash assembly.

Camera 24 is provided with an exposure control circuit for controlling the duration of the exposure of a film unit. As shown in FIG. 2, the exposure control circuit includes a source of electrical power, shown in the form of a battery 80, connected to one side of a switch $S_1$ by line 82. The other side of switch $S_1$ is connected to a magnet coil 84 by line 86, the coil in turn is connected to the output terminal of the Schmitt Trigger 90 by line 88. The ground terminal 92 of Schmitt Trigger 90 is connected to the negative side of battery 80 by line 94. A first transistor $Q_1$ has its emitter electrode 96 connected to line 86 by line 98, its base electrode 100 connected to line 94 by a line 102 having a resistor 104 therein, and its collector electrode 106 connected to a photoresponsive element 108 by line 110. A second transistor $Q_2$ has its emitter electrode 112 connected to line 86 by a line 114, its base electrode 116 connected to the negative side of battery 80 by a line 118 having resistors 120 and 122 therein, and its collector electrode 124 connected in series with resistor 126. The junction of resistors 120 and 122 is connected to the junction of collector 106 of transistor $Q_1$ and photoresponsive means 108. Resistor 126 and photoresponsive means 108 are connected to one side of a capacitor 130 by lines 128 and 132. Extending between line 132 and Schmitt Trigger 90 is a line 134 which is connectable with the negative side of battery 80 by a switch $S_2$. Finally, a line 136 is provided for connecting the positive power terminal of Schmitt Trigger 90 to line 86, then to $S_1$ and line 82 to the positive terminal of battery 80.

The exposure control circuit shown in FIG. 2 is also provided with switch means for converting the circuit from an ambient mode of operation to a flash mode of operation. This switching means comprises the above described spaced contacts 58 and 60. Contact 58 is connected to line 86 by line 140 and contact 60 is connected to the junction of resistor 104 and the base 100 of transistor $Q_1$ by line 142.

The operation of the exposure control circuit in the ambient mode of operation will now be described. The photographer initiates exposure of a film unit by depressing button 36 which initially closes switch $S_1$ to energize the exposure control circuit including magnet coil 84. Depressing button 36 farther will also result in the opening blade of the shutter moving under spring bias to its open or exposure position while the closing blade of the shutter is prevented from moving to its closing or exposure terminating position by the holding action of the magnet energized by coil 84. Switch $S_2$, which is initially held in the closed position by the opening blade, is opened in synchronization with, although not necessarily simultaneously, the movement of the opening blade to the open or exposure position. With switch $S_1$ closed, a complete circut exists through the emitter-base junction of transistor $Q_1$ and resistor 104 to provide a drive current to turn on and saturate transistor $Q_1$. Once saturated, transistor $Q_1$ does two things, i.e., (1) it connects photoresponsive means 108 into the circuit and (2) it limits the forward bias on the emitter-base junction of transistor $Q_2$ to a value less than that required to turn on $Q_2$. With transistor $Q_2$ in the off state, the flash timing resistor 126 is out of the circuit. Accordingly, current flow is diverted principally along line 110, photoresponsive means 108, lines 128 and 132 and capacitor 130 to line 94. Switch $S_2$ being open, the charge level at capacitor 130 commences to build up to a predetermined level at a rate which is a function of the conductance of photoresponsive means 108, which in turn is a function of the intensity of light incident upon the photoresponsive element. Line 132, located intermediate the photoresponsive means 108 and the capacitor 130, is connected to the input stage of Schmitt Trigger 90. Schmitt Trigger 90 has a normally conducting output stage connected to line 88 and a normally non-conducting input stage connected to line 134. These stages operate to reverse their conductive states very rapidly upon receipt at the input stage of a signal which is at least equal to a predetermined triggering level. Energized from line 86 through line 136 and coupled to ground or the negative side of battery 94 through line 92, the output stage remains conductive until the capacitor 130 reaches the triggering level. At that time the input and output stages become conducting and non-conducting, respectively, whereupon current flow ceases to flow through magnet coil 84 and the closing blade is released for movement toward its closing or exposure terminating position. Switch $S_1$ may then be opened by any suitable means to disconnect battery 80 from the rest of the exposure control circuit.

The exposure control circuit is convertible between the ambient mode of operation, described above, and a flash mode of operation by the simple act of coupling the flash assembly 10 to the flash socket assembly 38. Specifically, the flash assembly 10 is coupled by fully inserting the connector blade 18 into slot 44, the beveled mouth 74 of slot 44 and walls 45 assisting in guiding the connector blade 18 into its operative position in slot 44. Blade 18 is inserted into slot 44 until support 16 engages boss 40. At this time, the terminals and the socket conductive means 22 on connector blade 18 will be in electrical engagement with the first and second sets of contacts, as schematically shown in FIG. 2. As the connector blade 18 of the flash assembly 10 is inserted into the slot 44, the set of terminals 20, including ground terminal 20a, and the electrically conductive means 22 makes simultaneous sliding engagement with the first and second sets of contacts, respectively, in thesocket assembly. As can best be seen in FIG. 2, the engagement between terminals 20, 20a and the first set of contacts, i.e., contacts 46, 48, 50, 52, 54, and 56, electrically couples the lamps 12 into a flash sequencing circuit 144, of the type shown in U.S. Pat. No. 3,618,492, via lines 146, and the bridging of contacts 58 and 60 by the electrically conductive means 22 results in contacts 58 and 60 being electrically coupled together. The phrases "electrically coupled", "electrically conductive" and "electrically engaged", as used herein, mean that they form a segment of a circuit through which a flow of current can pass when connected to a source of electrical energy. Electrically coupling contact 58 to 60 automatically converts the exposure control circuit from the ambient mode of operation to a flash mode of operation. The operation of the camera in the flash mode is as follows. Depressing button 36 to initiate an exposure will result in (1) switch $S_1$ being closed to energize magnet coil 84 so as to provide an electromagnetic force for maintaining the closing blade of the shutter in its initial or closed position and (2) the opening blade of the shutter being released for movement toward its openIng or exposure initiating position, the latter movement opening switch $S_2$ as previously described. With switch $S_1$ in the closed position there is no forward bias on the emitter-base junction of transistor $Q_1$ because it is shorted out by the closed switch comprised of contacts 58, 60 and the electrically conductive means 22. With transistor $Q_1$ in a non-conducting state, the emitter-base junction of transistor $Q_2$ is forward biased from line 86 and line 114 through resistors 120 and 122 to line 94. Transistor $Q_2$ will thus be turned on to bring the flash timing resistor 126 into the circuit. Since transistor $Q_1$ is off, the only current that can flow through the photoresponsive means 108 to charge the timing capacitor 130 is the current available from the voltage divider action or resistors 120 and 122. The values of resistors 120 and 122 and the gain of transistor $Q_2$ may be chosen such that no significant current will flow through the photoresponsive means 108 when the charging rate of capacitor 130 is controlled by the flash timing resistor 126. When capacitor 130 reaches its aforementioned level it actuates Schmitt Trigger 90 whereupon the normally conducting stage becomes non-conducting, thereby preventing the flow of current through magnet coil 84 and line 88. With coil 84 deenergized the closing blade of the shutter may now move to its closed or exposure terminating position under the influence of suitable spring means. During the interval between opening and closing of the shutter the flash sequencing circuit, upon receiving a synchronizing signal, completes a circuit through one of the photoflash lamps 12 to illuminate the scene being photographed.

Figure 4:
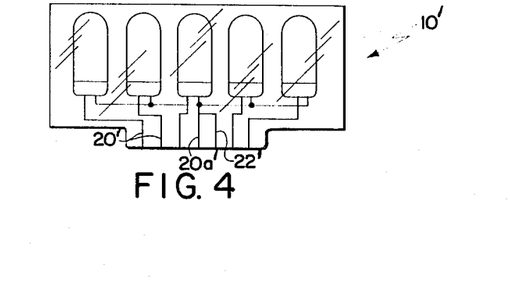
FIG. 4 is a schematic representation of an alternative embodiment of the invention.

Reference is mow made to FIG. 4 wherein is shown a modified flash assembly adapted for use in the instant invention. Flash assembly 10' is substantially identical to flash assembly 10 except that the previously described strip of electrically conductive material 22 is replaced by a similar electrically conductive strip 22' which is electrically coupled to the common ground terminal 20a' to define an inverted "U". Obviously, in this embodiment the flash socket assembly would only require seven contacts, rather than the eight contacts described in the preferred embodiment, and the exposure control circuit would be converted to a flash mode of operation upon two of the contacts being bridged by the "U" defined by the common ground terminal 20a' and the electrically conductive strip 22'.

Figures 5, 6:
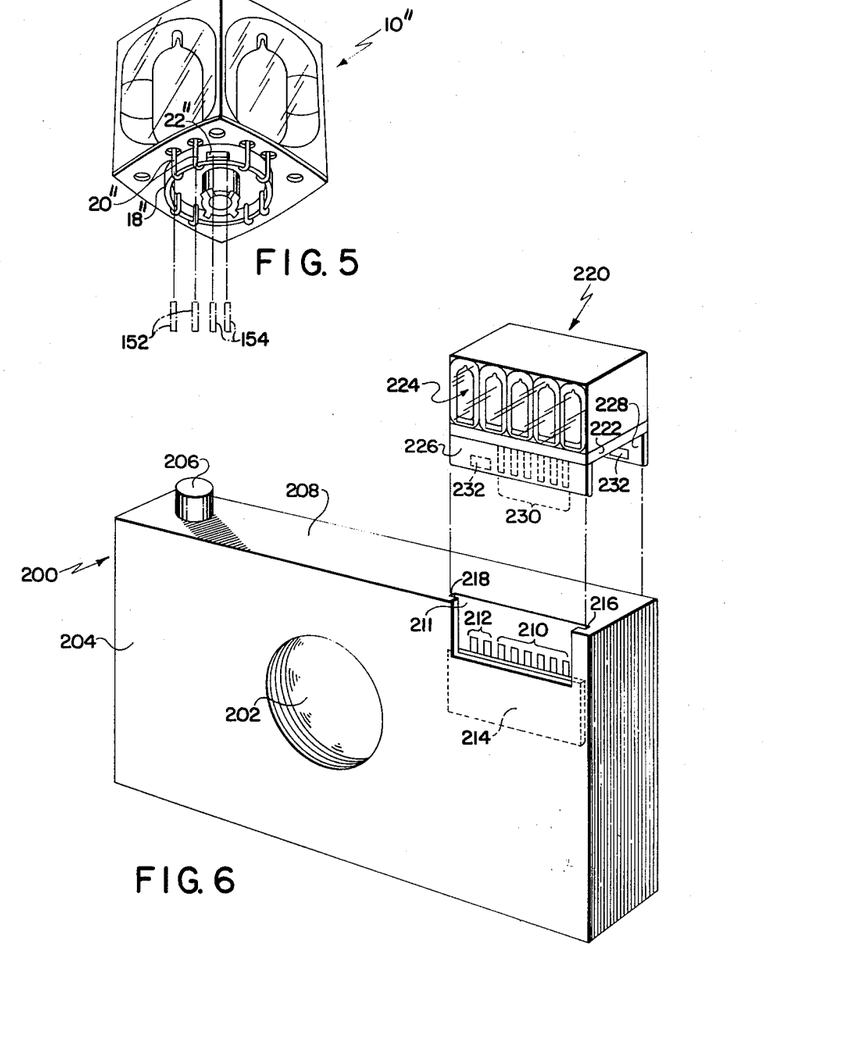
FIGS. 5 and 6 are perspective views of still other embodiments of the invention.

FIG. 5 shows still another embodiment of the invention as applied to a conventional flash cube 10" of the type which is adapted to be rotated to sequentially bring each of the photolamps therein into position for illumination of the subject to be exposed. The flash cube 10" includes connection means including a ring 18" which carries thereon a set of terminals 20" and an electrically conductive strip 22" (only one of which is shown) for each of the four photolamps. The flash socket assembly includes first and second sets of resilient contacts 152 and 154. Upon inserting the flash cube 10" into the flash socket, the first set of contacts 152 will electrically engage one set of terminals 20" with a sliding action to electrically couple the associated photoflash lamp into a flash firing circuit, and the second set of contacts 154 will be bridged by electrically conductive means 22" to convert the exposure control circuit of the camera to a flash mode of operation. After each exposure the flash cube 10" would be rotated ninety degrees to bring the next photoflash lamp and its associated terminals 22" and electrically conductive means into operative position relative to contacts 152 and 154. Alternatively, contacts 154 could be mounted in the flash socket such that they would extend at an angle of 90° relative to contacts 152 and use one rather than two of the terminals 20" for making the electrical connection between the terminals 154.

FIG. 6 shows still another embodiment of the invention. This embodiment includes a camera having a housing 200, a lens and shutter assembly 202 mounted in a forward wall 204 and a shutter release button 206 mounted in a top wall 208. A recess 210 is formed in walls 204 and 208 for accommodating first and second sets of resiliently mounted contacts 210 and 212, respectively. The recess 210 is adapted to be normally closed off by a door 214 (shown in the open position for reasons of clarity) mounted in guide tracks 216 and 218 such that the top surface of the door is normally flush with wall 208.

Camera housing 200 is especially adapted for use with a flash assembly of the type denoted 220. Flash assembly 220 includes a support 22 having mounted thereon oppositely facing linear arrays of photoflash lamps 224 (only one array being shown). Extending downwardly from support 222 are a pair of spaced, parallel connector blades 226 and 228 each of which has mounted thereon, on facing surfaces, a set of terminals 230 for the lamps and an electrically conductive strip 232. Flash assembly 220 is adapted to be coupled to the camera by straddling housing 200 with the spaced blades 226 and 228. The spacing between the blades is such that blade 226 will be slidably received by tracks 216 and 218 as blade 228 slidably engages the rear wall of camera housing 200. As the flash assembly 220 is coupled to the camera, blade 226 engages the top surface of door 214 and moves it, against the bias of a spring which normally maintains the door in the closed position, to the open position shown in FIG. 6. Blade 226 follows door 214 downwardly until support 222 bottoms out on top wall 208. During the downward movement of flash assembly 220, the rearwardly facing terminals 230 and the electrically conductive strip 232 on blade 226 simultaneously engage the first and second sets of terminals 210 and 212, respectively, to electrically couple the photoflash lamps 224 into a flash sequencing circuit and to convert the camera's exposure control circuit from an ambient mode of operation to a flash mode of operation.

Since certain changes may be made in the above apparatus without departing from the scope of the invention herein involved, it is intended that all matter contained in the above description (or shown in the accompanying drawings) shall be interpreted as illustrative and not in a limiting sense.

What is claimed is:

1. Photographic apparatus comprising:
   a device including
      means for supporting a source of artificial illumination;
      connector means extending from said supporting means;
      terminal means mounted on said connector means to be electrically coupled to the source of artificial illumination when the source of artificial illumination is supported on said supporting means; and
      electrically conductive means mounted on said connector means;
   and
   a camera including
      means for exposing a photosensitive element;
      an exposure control circuit operatively coupled to said exposing means for controlling the amount of light admitted into said camera by said exposing means, said exposure control circuit being convertible between a first mode of operation wherein ambient light is utilized to expose a photosensitive element and a second mode of operation wherein the source of artificial illumination is utilized for the exposure;
      means for receiving said connector means, said receiving means including first and second means for making electrical contact with said terminal means and said electrically conductive means, respectively, upon coupling said connector means to said receiving means, said second means comprising spaced contacts connected to said exposure control circuit, said electrical contact between said first means and said terminal means being effective to electrically couple the source of artificial illumination to a firing circuit and said electrical contact between said second means and said electrically conductive means being effective to electrically connect said spaced contacts to convert said exposure control circuit from said first mode of operation to said second mode of operation.

2. Photographic apparatus as defined in claim 1 wherein said pair of spaced contacts are mounted in position for sliding engagement with said electrically conductive means.

3. Photographic apparatus as defined in claim 1 wherein said receiving means includes means for preventing movement of said spaced contacts toward each other.

4. Photographic apparatus as defined in claim 1 wherein said spaced contacts are resiliently biased into engagement with said electrically conductive means on said connector means to assist in retaining the coupling between said receiving means and said connector means.

5. Photographic apparatus as defined in claim 1 wherein said first and second means are mounted in position to be simultaneously engaged by said terminal means and said electrically conductive means, respectively, upon coupling said connector means to said receiving means thereby insuring operation of said camera in the second mode only when said first means are in engagement with said terminal mans.

6. Photographic apparatus as defined in claim 1 wherein said device includes a plurality of photoflash lamps of common orientation and said receiving means includes means for preventing rotation of said device relative to said receiving means.

7. Photographic apparatus as defined in claim 1 wherein said connector means includes a pair of spaced connector blades.

8. Photographic apparatus comprising:
   a device including
      means for supporting a source of artificial illumination;
      connector means extending from said support means;
      terminal means including a ground lead, mounted on said connector means and coupled to the source of artificial illumination; and
      electrically conductive means mounted on said connector means, said electrically conductive means being electrically coupled to said ground lead;
   and
   a camera including
      means for exposing a photosensitive element;
      an exposure control circuit convertible between a first mode of operation wherein ambient light is utilized to expose a photosensitive element and a second mode of operation wherein the source of artificial illumination is utilized for the exposure;
      means for receiving said connector means, said receiving means including first and second means coupled to said exposure control circuit, said first and second means be adapted, upon coupling said device to said receiving means, to make electrical contact with said terminal means including said ground lead and with said electrically conductive means, respectively, whereby the source of artificial illumination is electrically coupled to a flash firing circuit and said exposure control circuit is converted to said second mode of operation.

9. Photographic apparatus as defined in claim 8 wherein said second means is mounted in position for sliding engagement with said electrically conductive means.

10. Photographic apparatus as defined in claim 8 wherein said receiving means includes means for preventing movement of said second means toward said first means.

11. Photographic apparatus as defined in claim 8 wherein said second means is resiliently biased into engagement with said electrically conductive means to assist in retaining the coupling between said receiving means and said connector means.

12. Photographic apparatus as defined in claim 8 wherein said first and second means are mounted in position for simultaneous engagement with said terminal means and said electrically conductve means whereby firing of said photoflash lamp is possible only when said exposure control circuit is in said second mode of operation.

13. Photographic apparatus as defined in claim 8 wherein said device includes a plurality of photoflash lamps of common orientation and said receiving means includes means for preventing rotation of said device relative to said receiving means.

14. Photographic apparatus as defined in claim 8 wherein said connector means includes a pair of spaced connector blades.

15. For use with a photographic camera having an exposure control circuit convertible between a first mode of operation wherein ambient light is utilized for exposure of a photosensitive element and a second mode of operation wherein artificial illumination is utilized for exposure, a socket assembly for receivng a device for supporting a source of artificial illumination having a support from which extends a connector carrying a set of terminals for the source of artificial illumination and electrically conductive means for bridging a pair of spaced contacts in the exposure control circuit to automatically change the operation thereof from the first mode of operation to the second mode of operation upon coupling the device to said socket assembly, said socket assembly comprising:
  means for receiving the connector of the device and guiding the connector into a predetermined operative position;
  first means for making electrical contact with the terminals on the connector; and
  second means comprising a pair of spaced contacts coupled to the exposure control circuit and mounted in position to be bridged by the electrically conductive means on the connector for electrically coupling said pair of contacts to each other to change the exposure control circuit of the photographic camera from the first mode of operation to the second mode of operation.

16. A socket assembly as defined in claim 15 wherein said pair of spaced contacts are mounted in position for sliding engagement with the electrically conductive member on the connector.

17. A socket assembly as defined in claim 15 wherein said second means include resilient means for exerting a predetermined loading the connector to assist in retaining the device in said operative position.

18. A socket assembly as defined in claim 15 wherein said socket assembly further includes means for preventing movement of said spaced contacts toward each other.

19. A socket assembly as defined in claim 15 wherein said first and second means are mounted in position to simultaneously engage the terminals and electrically conductive means on the connector, respectively, thereby insuring operation of the camera in said second mode only when said first means are in electrical engagement with the terminals.

20. A socket assembly as defined in claim 15 further including closure means movable to a position covering said first and second means in response to uncoupling the connector of the device from said socket assembly.

21. For use with a photographic camera having an exposure control circuit convertible between a first mode of operation wherein ambient light is utilized for exposure of a photosensitive element and a second mode of operation wherein artificial illumination is utilized for exposure, a socket assembly for receiving a device having a support for supporting a source of artificial illumination, a connector carrying a set of terminals including a ground lead electrically connectable to the source of artificial illumination and electrically conductive means electrically coupled to said ground lead, said socket assembly comprising:
  means for receiving the connector of the device and guiding the connector into a predetermined operative position within said socket assembly;
  first means for making electrical contact with the terminals including said common ground; and
  second means mounted in position to be engaged by the electrically conductive means on the connector upon coupling of the latter to said receiving means to convert the exposure control circuit to said second mode of operation.

22. A socket assembly as defined in claim 21 wherein said second means is mounted in position for sliding engagement by the electrically conductive means.

23. A socket assembly as defined in claim 21 wherein said second means includes resilient means for exerting a predetermined loading on the connector to assist in retaining the device in said socket assembly.

24. A socket assembly as defined in claim 21 wherein said receiving means includes means for preventing movement of said first and second means toward each other.

25. A socket assembly as defined in claim 21 wherein said first and second means are mounted in position for simultaneous engagement with the terminals and electrically conductive means thereby insuring operation of the camera in the second mode only when said first means are in engagement with the terminals.

26. A socket assembly as defined in claim 21 further including closure means mounted in covering relation to said first and second means, said closure means being movable in response to coupling the connector of the device to the receiving means for uncovering said first and second means.

27. For use with a photographic camera having an exposure control circuit convertible between a frist mode of operation wherein ambient light is utilized for exposure of a photosensitive element and a second mode of operation wherein artificial illumination is utilized for exposure, a socket assembly for receiving a device having a support structure for supporting a source of artificial illumination, a connector blade carrying electrical terminals for the source of artificial illumination and conductor means for bridging a pair of spaced contacts coupled to the exposure control circuit to automatically change the operation thereof from the first mode of operation to the second mode of operation upon insertion of the connector blade into said socket assembly, said socket assembly comprising:

blade support means for nonrotatably supporting the connector blade of the device in a predetermined operative position with said socket assembly;

first means for making electrical contact with the terminals on the connector blade upon insertion of the connector blade into said socket assembly; and second means comprising a pair of spaced contacts coupled to the exposure control circuit, said pair of contacts being mounted in position to be bridged by the conductor means on the connector blade for electrically coupling said pair of contacts to each other to convert the exposure control circuit from the first mode of operation to the second mode of operation.

28. A socket assembly as defined in claim 27 wherein said pair of contacts are mounted in position for sliding engagement by the conductor means on the connector blade upon the insertion of the latter into said socket assembly.

29. A socket assembly as defined in claim 27 wherein said second means include resilient means for exerting a predetermined loading on the connector blade to assist in retaining the device in its operative position relative to said socket assembly.

30. A socket assembly as defined in claim 27 wherein said socket assembly further includes means for preventing movement of said spaced contacts toward each other.

31. A socket assembly as defined in claim 27 further including means for mounting said first and second means in position for simultaneous engagement with the terminals and conductor means, respectively, on the connector blade thereby insuring operation of the camera in the second mode only when said first means are in engagement with the terminals.

32. A socket assembly as defined in claim 27 further including closure means mounted in covering relation to said first and second means, said closure means being movable in response to coupling of the connector blade to said blade support means for uncovering said first and second means.

33. A socket assembly as defined in claim 32 wherein said closure means is movable to a position covering said first and second means in response to uncoupling the connector blade from said blade support means.

34. A device for use with a photographic camera having an exposure control circuit convertible between a first mode of operation wherein ambient light is utilized for exposure of a photosensitive element and a second mode of operation wherein a source of artificial illumination is utilized for exposure, comprising:

support means for supporting a source of artificial illumination;

connector means extending from said support means for operatively connecting said device to a photographic camera;

terminal means mounted on said connector means and operatively connectable to the source of artificical illumination; and electrically conductive means mounted on said connector means, said electrically conductive means being constructed and arranged to bridge a pair of spaced contacts coupled to the exposure control circuit upon connection of said device to the camera to change the operation of the exposure control circuit from the first mode of operation to the second mode of operation.

35. A device as defined in claim 34 further including means for mounting said electrically conductive means on said connector means in position for engagement with the pair of spaced contacts substantially at the instant that said terminal means are electrically coupled to a photoflash firing circuit, thereby insuring the firing of the source of artificial illumination only when the exposure control circuit is in the second mode of operation.

36. A device as defined in claim 34 wherein said connector means includes a pair of spaced members adapted to straddle a housing section of the camera.

37. A device for use with a photographic camera having an exposure control circuit convertible between a first mode of operation wherein ambient light is utilized for exposure of a photosensitive element and a second mode of operation wherein a source of artificial illumination is utilized for exposure, comprising:

support means for supporting a source of artificial illumination;

connector means extending from said support means for operatively connecting said device to a photographic camera;

terminal means mounted on said connector means and operatively connectable to the source of artificial illumination; and electrically conductive means mounted on said connector means and electrically coupled to said terminal means, said electrically conductive means and one of said terminal means being constructed and arranged to bridge a pair of spaced contacts coupled to the exposure control circuit upon connection of said device to the camera to change the operation of the exposure control circuit from the first mode of operation to the second mode of operation.

38. A device as defined in claim 37 further including means for mounting said electrically conductive means and said one terminal means on said connector means in position for engagement with the pair of spaced contacts substantially at the instant that the remainder of said terminal means are electrically coupled to a firing circuit, thereby insuring the firing of the source of artificial illumination only when the exposure control circuit is in the second mode of operation.

39. A flash assembly as defined in claim 37 wherein said connector means includes a pair of spaced members adapted to straddle a housing section of the camera.

40. A camera for use with an assembly including first means for supporting a normally inactive source of artificial illumination, connector means extending from the supporting means, terminal means mounted on the connector means for connection with the source of artificial illumination, and an electrical conducting strip mounted on the connector means, the electrical conducting strip being configured so as not to be in electrical communication with the terminal means and the source of artificial illumination when the source is supported on the first means, said camera inluding:

second means for receiving the connector means;

third means for performing an ambient light mode photographic program, said third means being selectively convertible, at least in part responsive to a given electrical energy input, to means for performing an artificial light mode photographic program employing the source of artificial illumination; and normally inoperative fourth means for facilitating the input of the electrical energy input to said third means, said fourth means comprising a pair of spaced contacts coupled to said third means and located to be electrically coupled together by the conducting strip when the assembly is mounted on said camera with its connector means positioned in said second means, thereby rendering said fourth means operative to convert said third means to the artificial light mode photographic program.

41. Photographic apparatus comprising:
a device including
first means for supporting a normally inactive soruce of artificial illumination;
connector means extending from said supporting means;
terminal means mounted on said connector means for connection with the source of artificial illumination; and
an electrically conducting strip mounted on said connector means and configured so as not to be in electrical communication with said terminal means and the source of artificial illumination when the source is supported on said first means; and
a camera including
second means for receiving said connector means;
third means for performing an ambient light mode photographic program, said third means being selectively convertible, at least in part responsive to a given electrical energy input, to means for performing an artificial light mode photographic program employing the source of artificial illumination; and
normally inoperative fourth means for facilitating the input of said electrical energy to said third means, said fourth means comprising a pair of spaced contacts coupled to said third means and located to be electrically coupled together by said conducting strip when said device is mounted on said camera with said connector means positioned in said second means, thereby rendering said fourth means operative to convert said third means to the artificial light mode photographic program.

42. Photographic apparatus for use with a camera including first means for receiving a connector, second means for performing an ambient light mode photographic program, the second means being selectively convertible, at least in part responsive to a given electrical energy input, to means for performing an artificial light mode photographic program employing an externally mounted source of artificial illumination, and normally inoperable third means for facilitating the input of the given electrical energy input to the second means, the third means comprising electrical communicating means, said photographic apparatus comprising:
means for supporting a normally inactive source of artificial illumination;
connector means extending from said supporting means and configured to be received in the first means of the camera and electrical conducting means mounted on said connector, said electrical conducting means being configured so as not to be in electrical communication with the source of artificial illumination when the source is supported on said first means, said electrical conducting means further being configured to be accessible for electrical communication with the electrical communicating means of the camera when said apparatus is mounted in the first means of the camera to thereby render the third means of the camera operable.

* * * * *